United States Patent
Zhang et al.

(10) Patent No.: US 10,313,288 B2
(45) Date of Patent: Jun. 4, 2019

(54) PHOTO SHARING METHOD AND DEVICE

(71) Applicant: Xiaomi Inc., Beijing (CN)

(72) Inventors: Tao Zhang, Beijing (CN); Fei Long, Beijing (CN); Zhijun Chen, Beijing (CN)

(73) Assignee: XIAOMI INC., Haidian District, Beijing ( * ) Notice: Subject to any disclaimer, the term of this patent is extended or adjusted under 35 U.S.C. 154(b) by 296 days.

(21) Appl. No.: 15/207,514

(22) Filed: Jul. 12, 2016

(65) Prior Publication Data

US 2017/0034097 A1    Feb. 2, 2017

(30) Foreign Application Priority Data

Jul. 31, 2015  (CN) .......................... 2015 1 0462781

(51) Int. Cl.
*G06F 15/16* (2006.01)
*H04L 12/58* (2006.01)
(Continued)

(52) U.S. Cl.
CPC ............ *H04L 51/18* (2013.01); *G06F 16/583* (2019.01); *G06K 9/00677* (2013.01);
(Continued)

(58) Field of Classification Search
CPC ......... H04L 51/18; H04L 51/10; H04L 51/32; G06F 17/30247; G06K 9/00677; G06K 9/00288
See application file for complete search history.

(56) References Cited

U.S. PATENT DOCUMENTS 7,916,976 B1 *  3/2011  Kedikian .......... G06F 17/30244
                                                      382/118
8,560,625 B1   10/2013  Hardman et al.
(Continued)

FOREIGN PATENT DOCUMENTS

CN       102368746 A    3/2012
CN       102982064 A    3/2013
(Continued)

OTHER PUBLICATIONS

"International Search Report for PCT/CN2015/097800".
(Continued)

*Primary Examiner* — Michael Won
(74) *Attorney, Agent, or Firm* — Jun He Law Offices P.C.; James J. Zhu

(57) ABSTRACT

A photo sharing method includes: receiving, from a user, a party photo sharing instruction regarding a to-be-shared party photo set, where the to-be-shared party photo set has party marker information and includes at least one party photo; acquiring a face recognition result by conducting face recognition on each party photo contained in the to-be-shared party photo set, and determining a face image set contained in the to-be-shared party photo set according to the face recognition result; determining, from each contact photo contained in a contact list, each target contact photo which matches with each face image in the face image set respectively; and sending the to-be-shared party photo set to each target contact respectively according to contact information corresponding to the each target contact photo.

13 Claims, 10 Drawing Sheets

(51) Int. Cl.
*G06F 16/583* (2019.01)
*G06K 9/00* (2006.01)
*H04L 29/08* (2006.01)

(52) U.S. Cl.
CPC .............. *H04L 51/10* (2013.01); *H04L 51/32* (2013.01); *H04L 67/306* (2013.01); *G06K 9/00288* (2013.01)

(56) References Cited

U.S. PATENT DOCUMENTS

| | | | |
|---|---|---|---|
| 9,098,584 B1* | 8/2015 | Fredinburg | G06F 17/30864 |
| 9,357,364 B2* | 5/2016 | Kim | H04M 1/27455 |
| 9,704,231 B1* | 7/2017 | Kulewski | G06T 7/0002 |
| 9,721,148 B2* | 8/2017 | Ganong | G06K 9/00288 |
| 9,811,245 B2* | 11/2017 | Poletto | G06F 3/0484 |
| 9,912,870 B2* | 3/2018 | Yu | H04N 1/00209 |
| 9,958,952 B2* | 5/2018 | Buban | G06F 3/017 |
| 10,027,726 B1* | 7/2018 | Ozog | G06Q 10/00 |
| 2007/0201731 A1* | 8/2007 | Fedorovskaya | G06F 17/30265 |
| | | | 382/118 |
| 2008/0192129 A1* | 8/2008 | Walker | G11B 27/034 |
| | | | 348/231.2 |
| 2008/0207271 A1* | 8/2008 | Krutik | H04M 1/274583 |
| | | | 455/566 |
| 2010/0287053 A1* | 11/2010 | Ganong | G06F 17/30247 |
| | | | 705/14.66 |
| 2010/0306249 A1* | 12/2010 | Hill | G06F 17/30867 |
| | | | 707/769 |
| 2010/0325218 A1* | 12/2010 | Castro | G06Q 10/10 |
| | | | 709/206 |
| 2011/0038512 A1* | 2/2011 | Petrou | G06F 17/30256 |
| | | | 382/118 |
| 2011/0087747 A1* | 4/2011 | Hirst | G06Q 10/107 |
| | | | 709/206 |
| 2012/0155718 A1* | 6/2012 | Hwang | G06K 9/00281 |
| | | | 382/118 |
| 2012/0254169 A1* | 10/2012 | Landsman | G06Q 30/00 |
| | | | 707/736 |
| 2013/0120591 A1 | 5/2013 | Bednarczyk et al. | |
| 2013/0148003 A1* | 6/2013 | Penev | H04N 5/23293 |
| | | | 348/333.11 |
| 2014/0063315 A1 | 3/2014 | Lee et al. | |
| 2014/0082633 A1* | 3/2014 | Kim | G06Q 10/103 |
| | | | 719/313 |
| 2014/0095626 A1 | 4/2014 | Hsi | |
| 2015/0081791 A1 | 3/2015 | Jacobs | |
| 2015/0131872 A1* | 5/2015 | Ganong | G06K 9/00677 |
| | | | 382/118 |
| 2015/0177937 A1* | 6/2015 | Poletto | G06F 3/0484 |
| | | | 715/739 |
| 2015/0178553 A1 | 6/2015 | Yoo et al. | |
| 2015/0227782 A1* | 8/2015 | Salvador | G06K 9/00221 |
| | | | 382/118 |
| 2016/0073034 A1* | 3/2016 | Mukherjee | H04N 5/23293 |
| | | | 348/333.11 |
| 2016/0093020 A1* | 3/2016 | Basalamah | H04N 5/225 |
| | | | 345/634 |
| 2017/0093780 A1* | 3/2017 | Lieb | G06F 17/30265 |
| 2017/0116466 A1* | 4/2017 | Resnick | G06K 9/00288 |
| 2018/0024715 A1* | 1/2018 | Poletto | G06F 3/04886 |
| 2018/0091728 A1* | 3/2018 | Brown | G06F 3/0485 |

FOREIGN PATENT DOCUMENTS

| | | |
|---|---|---|
| CN | 103064864 A | 4/2013 |
| CN | 103369031 A | 10/2013 |
| CN | 103414814 A | 11/2013 |
| CN | 104317932 A | 1/2015 |
| CN | 105095873 A | 11/2015 |
| EP | 2530570 A2 | 5/2012 |
| JP | 2008295086 A | 12/2008 |
| JP | 2010523034 A | 7/2010 |
| JP | 2011155385 A | 8/2011 |
| JP | 2012247841 A | 12/2012 |
| JP | 2014072836 A | 4/2014 |
| RU | 2293446 C2 | 7/2005 |

OTHER PUBLICATIONS

Esteban Vazquez-Fernandez et al, "Built-in face recognition for smart photo sharing in mobile devices", Multimedia and Expo (ICME), 2011 IEEE International Conference on, IEEE, Jul. 11, 2011, pp. 1-4.
Casti Sara et al, "Click and share: A face recognition tool for the mobile community", 2014 IEEE International Conference on Image Processing (ICIP), IEEE, Oct. 27, 2014, pp. 1952-1956.
Extended European Search Report for EP Application No. 16180306.9 dated Dec. 2, 2016.
International Search Report for PCT Applcation No. PCT/CN2015/097800.

* cited by examiner

PHOTO SHARING METHOD AND DEVICE

CROSS-REFERENCE TO RELATED APPLICATIONS

This application is based on and claims priority to Chinese Patent Application No. 201510462781.0, filed on Jul. 31, 2015, the entire contents of which are incorporated herein by reference.

TECHNICAL FIELD

The present disclosure relates to the field of communication technologies, and more particularly, to a photo sharing method and device.

BACKGROUND

Intelligent terminals have become a kind of electronic devices essential to people's daily life. When people go to a party or hang out with friends, they use a terminal device such as a smart mobile phone to take photos. Therefore, the intelligent terminal has become a main camera device.

In a party, each participant may take some photos, and share these photos with others in order to exchange photos photographed in this party. Typically, it is implemented by sending photos to each other manually. For example, A, B, C and D participate in a party and each of them takes some party photos respectively. A sends photographed photos to B, C and D respectively by means of communication modes such as WeChat™ or a text message or the like. In a similar way, B may also send photographed photos to A, C and D, and so does C or D.

SUMMARY

The present disclosure provides a photo sharing method and device.

According to a first aspect of the embodiments of the present disclosure, a photo sharing method is provided, including: receiving, from a user, a party photo sharing instruction regarding a to-be-shared party photo set, where the to-be-shared party photo set has party marker information and includes at least one party photo; acquiring a face recognition result by conducting face recognition on each party photo contained in the to-be-shared party photo set, and determining a face image set contained in the to-be-shared party photo set according to the face recognition result; determining, from each contact photo contained in a contact list, each target contact photo which matches with each face image in the face image set respectively; and sending the to-be-shared party photo set to each corresponding target contact respectively according to contact information corresponding to the each target contact photo.

According to a second aspect of the embodiments of the present disclosure, a photo sharing device is provided, including: a processor; and a memory configured to store instructions executable by the processor; where the processor is configured to: receive, from a user, a party photo sharing instruction regarding a to-be-shared party photo set, where the to-be-shared party photo set has party marker information and includes at least one party photo; acquire a face recognition result by conducting face recognition on each party photo contained in the to-be-shared party photo set, and determine a face image set contained in the to-be-shared party photo set according to the face recognition result; determine, from each contact photo contained in a contact list, each target contact photo which matches with each face image in the face image set respectively; and send the to-be-shared party photo set to each corresponding target contact respectively according to contact information corresponding to the each target contact photo.

According to a third aspect of the embodiments of the present disclosure, there is provided a non-transitory computer-readable storage medium having stored therein instructions that, when executed by a processor of a terminal device, causes the terminal device to perform a method for sharing photos, the method including: receiving, from a user, a party photo sharing instruction regarding a to-be-shared party photo set, wherein the to-be-shared party photo set has party marker information and comprises at least one party photo; acquiring a face recognition result by conducting face recognition on each party photo contained in the to-be-shared party photo set, and determining a face image set contained in the to-be-shared party photo set according to the face recognition result; determining, from each contact photo contained in a contact list, each target contact photo which matches with each face image in the face image set respectively; and sending the to-be-shared party photo set to each target contact respectively according to contact information corresponding to the each target contact photo.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

Specific embodiments of the present disclosure are shown by the above drawings, and more detailed description will be made hereinafter. These drawings and text description are not for limiting the scope of conceiving the present disclosure in any way, but for illustrating the concept of the present disclosure for those skilled in the art by referring to specific embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Initially, several terms involved in the embodiments of the present disclosure are defined.

Face recognition technology refers to computer technology for conducting identity authentication by analyzing and comparing visual feature information of faces. Specifically, it is determined whether a face is present in an inputted face image based on a face feature. If the face is present, further information such as location and size of each face and location of each main facial organ is provided. Based on these information, identity characteristics contained in each face are further extracted and compared with a known face to recognize the identity of each face.

Figure 1:
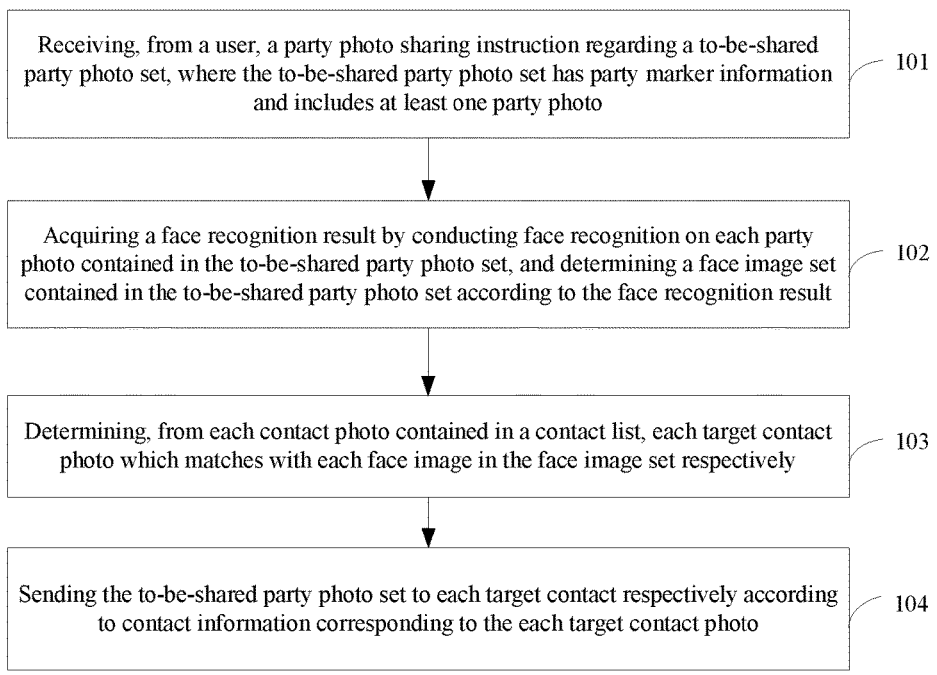
FIG. 1 illustrates a flowchart of Embodiment I of a photo sharing method according to an exemplary embodiment.

FIG. 1 illustrates a flowchart of Embodiment I of a photo sharing method according to an exemplary embodiment. The method may be executed by a terminal device such as a smart mobile phone, a smart camera, a portable computer, a tablet computer or the like, and a to-be-shared party photo set mentioned in this embodiment is stored in the terminal device. As shown in FIG. 1, the photo sharing method includes the following steps.

In Step 101, a party photo sharing instruction regarding a to-be-shared party photo set from a user is received, wherein the to-be-shared party photo set has party marker information and includes at least one party photo.

In this embodiment, a terminal user in a party may take multiple party photos. Each photographed party photo is marked with a party marker when it is marked or named. The party marker includes information such as time, location, party scene or the like. For example, the time information may be automatically determined by a clock of the user terminal, the location may be determined according to GPS location information of the user terminal, and the party scene may be, for example, a certain park or a certain playground, which may be named and determined by the user.

For the convenience of management, the user generally may gather multiple party photos photographed in a same party and store these photos into a folder in a terminal album. As a party photo set containing these party photos, this folder may be named after the foregoing party marker.

When the user wants to share these party photos (i.e., the foregoing to-be-shared party photo set) photographed in the party with other friends in the party, the user may perform a certain operation on the folder to trigger the sharing and processing. For example, the user clicks on the folder three times to send a party photo sharing instruction to trigger the sharing and processing.

In Step 102, a face recognition result by conducting face recognition on each party photo contained in the to-be-shared party photo set is acquired, and a face image set contained in the to-be-shared party photo set according to the face recognition result is determined.

In this embodiment, the foregoing to-be-shared party photo set usually contains multiple party photos. In order to acquire all face images contained in the to-be-shared party photo set, the face recognition is performed on each party photo by using the face recognition technology to acquire the face recognition result.

Specifically, each face image contained in each party photo is detected by using an Adaboost method, and features of each face image are extracted. In this way, the face recognition result could be, for example, face images having similarity greater than a relatively high threshold are clustered together based on a feature similarity. Here, the face images having similarity greater than the relatively high threshold is clustered together, which merely indicates that these face images correspond to a same person, instead of capturing these face images from the corresponding party photo. Therefore, these face images may be denoted with an identical clustering mark to indicate that these face images fall into a clustering result. Thus, all clustering results contained in the to-be-shared party photo set can be acquired according to the face recognition result, and each clustering result corresponds to multiple face images of one person. For the ease of subsequent processing, one face image may be selected from each clustering result as a representative of the clustering result. In this way, the face image set contained in the foregoing to-be-shared party photo set is acquired, where the photo set consists of each face image represented by each clustering result.

It should be noted that the foregoing face recognition process may be implemented by a terminal, i.e., the foregoing process may be conducted by the user terminal to obtain the face image set. Alternatively, the foregoing face recognition process may be implemented by a cloud server.

Specifically, acquiring the face recognition result based on the cloud server may be implemented in the following way.

The terminal sends a processing request including the party marker information and a user account to the cloud server. Upon receiving the processing request, the cloud server is configured to acquire, from a cloud album corresponding to the user account, the to-be-shared party photo set corresponding to the party marker information. The cloud server is also configured to conduct face recognition on each party photo contained in the to-be-shared party photo set by means of face recognition technology to acquire the face recognition result. Then, the terminal receives the face recognition result sent by the cloud server.

In other words, in this embodiment, after photographing the foregoing to-be-shared party photo set, the terminal user may upload the party photo set to the cloud server and store it in the cloud album corresponding to the user account. Consequently, the cloud server can acquire the to-be-shared party photo set from the cloud album of the user according to the party marker. In an embodiment, the face recognition process performed by the cloud server on the to-be-shared party photo set is the same as that performed at the terminal side, which is not repeated anymore herein.

In Step 103, each target contact photo that matches with each face image in the face image set respectively is determined from each contact photo contained in a contact list.

In this embodiment, it is assumed that in addition to contact information of each contact, a photo (for example, a photo sticker) is also stored for each associated contact in the contact list stored in the terminal.

After the foregoing face image set is acquired, similar to the foregoing face recognition process, it can be determined whether each face image contained in the face image set is matched with the photo of any contact contained in the contact list, so as to determine each target contact photo which matches with each face image in the face image set respectively.

Specifically, feature information of each face image and feature information of each contact photo may be extracted, and then a matching correspondence between each face image and each contact photo is determined based on the feature similarity. In an embodiment, the foregoing feature information includes, for example, contour features of eyebrows, eyes, nose, mouth, face or the like.

In Step 104, the to-be-shared party photo set is sent to each target contact respectively according to contact information corresponding to the each target contact photo.

After the matched target contact corresponding to the face image contained in the face image set is acquired, the foregoing to-be-shared party photo set is sent to each target contact according to contact information of each target contact in the contact list. The contact information of each target contact may include, for example, a WeChat™ number, a QQ™ number, a mobile phone number, an e-mail address or the like, from which one piece of contact information may be determined for sending the to-be-shared party photo set to each target contact. Specifically, which contact information is used may be determined according to different algorithm. In an embodiment, a priority ranking may be performed on the multiple pieces of contact information. For example, in order of descending priority, it successively includes a WeChat™ number, a QQ™ number, a mobile phone number and an e-mail address. If the WeChat™ number is available, i.e., the target contact is being logged into the WeChat™, a WeChat™ dialogue with the target contact may be automatically established, from which the to-be-shared photo set is loaded and sent to the target contact. If the target contact is not logged into the WeChat™, which means that the WeChat™ contact information is unavailable, the to-be-shared photo set may be sent by means of the next priority contact information, QQ™, and so on.

It should be noted that in this embodiment what is sent to each target contact is the foregoing to-be-shared party photo set, i.e., all party photos in the to-be-shared party photo set, thereby implementing sharing of the to-be-shared party photo set photographed by the terminal user with other party participants.

In this embodiment, in response to the user's instruction of sharing a party photo set with a party marker, face recognition is firstly performed on each party photo in the party photo set to recognize the face image set included in the party photo set. Then each face image in the recognized face image set is matched with each contact photo in the contact list to acquire contact information of a matched contact. In this way, based on the acquired contact information of each matched contact, the party photo set is automatically shared with each matched contact. In the technical solution, by means of automatic recognition of the face image in the party photo and automatic matching of the face image with the contact photo, automatic and accurate sharing of the party photo can be implemented, and thus the efficiency of sharing and processing the party photo is greatly improved.

As mentioned in the embodiment of FIG. 1, a clustering marker may be applied to each face image contained in each party photo by means of feature similarity. In this way, the occurrence number of the face image representing the same person in the foregoing face image set is acquired by calculating the number of the same clustering markers. Reasons for calculating the occurrence number of each face image in the foregoing face image set are based on the considerations of the following actual situations.

When multiple friends join a party, everyone may take multiple party photos. However, in one or more certain party photos, an irrelevant person may be also photographed in addition to friends, for example, a passerby A. The passerby A is an irrelevant stranger, whose photo and contact information are not present in the contact list. It is undoubtedly useless work to include the face image of the passerby A in the foregoing face image set and to match it with each contact photo in the contact list, leading to reduced efficiency in matching and processing work. Therefore, the face image of the passerby A from the foregoing face image set may be precluded.

Figure 2:
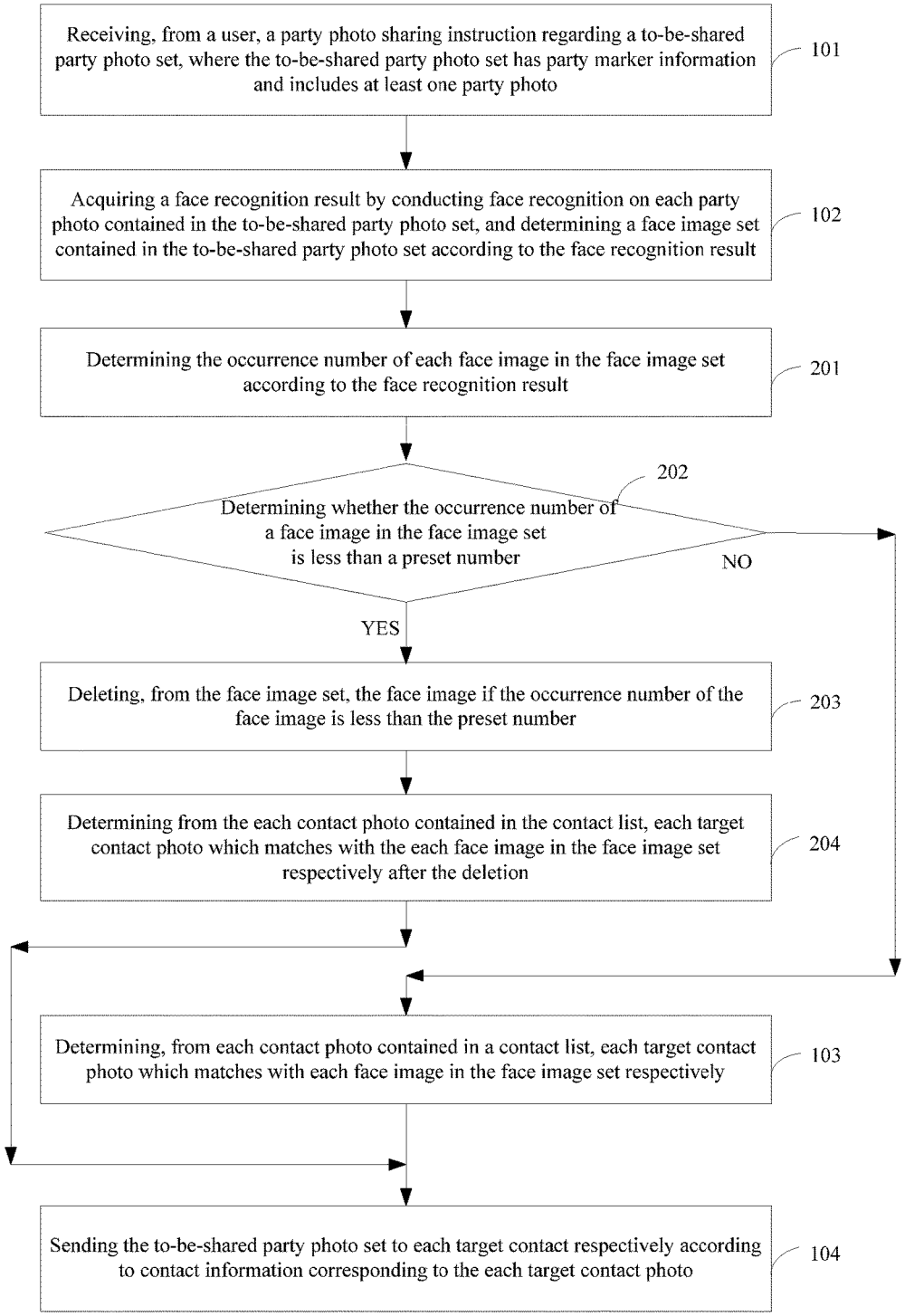
FIG. 2 illustrates a flowchart of Embodiment II of a photo sharing method according to an exemplary embodiment.

Therefore, as shown in FIG. 2, which illustrates a flowchart of Embodiment II of a photo sharing method according to an exemplary embodiment, on the basis of the embodiment as shown in FIG. 1, after the foregoing Step 102, the following steps are also included.

In Step 201, the occurrence number of each face image in the face image set is determined according to the face recognition result.

In Step 202, it is determined whether the occurrence number of a face image in the face image set is less than a preset number. Step 203 is executed if the occurrence number of the face image is less than the preset number, otherwise Step 103 is directly executed. The foregoing preset number is, for example, 2.

In Step 203, the face image with occurrence number being less than the preset number is deleted from the face image set, and the face image set after the deletion is obtained.

Accordingly, after Step 203, the foregoing Step 103 is adaptively changed as follows.

In Step 204, each target contact photo which matches with the each face image respectively in the face image set after the deletion is determined from each contact photo contained in the contact list.

In this embodiment, by assessing the occurrence number of each face image in the face image set, an irrelevant face image can be eliminated, thereby improving the efficiency of matching the face image with the contact photo and ensuring the accuracy of sharing the party photo set with other party participants.

In the foregoing embodiments, after each target contact is determined, the to-be-shared party photo set is automatically sent to each target contact immediately according to contact information corresponding to each target contact. However, for some reasons, the terminal user may not want to send the party photo set to one or more certain target contacts. For this purpose, as shown in FIG. 3, a manner for a user to select a target contact is provided.

Figure 3:
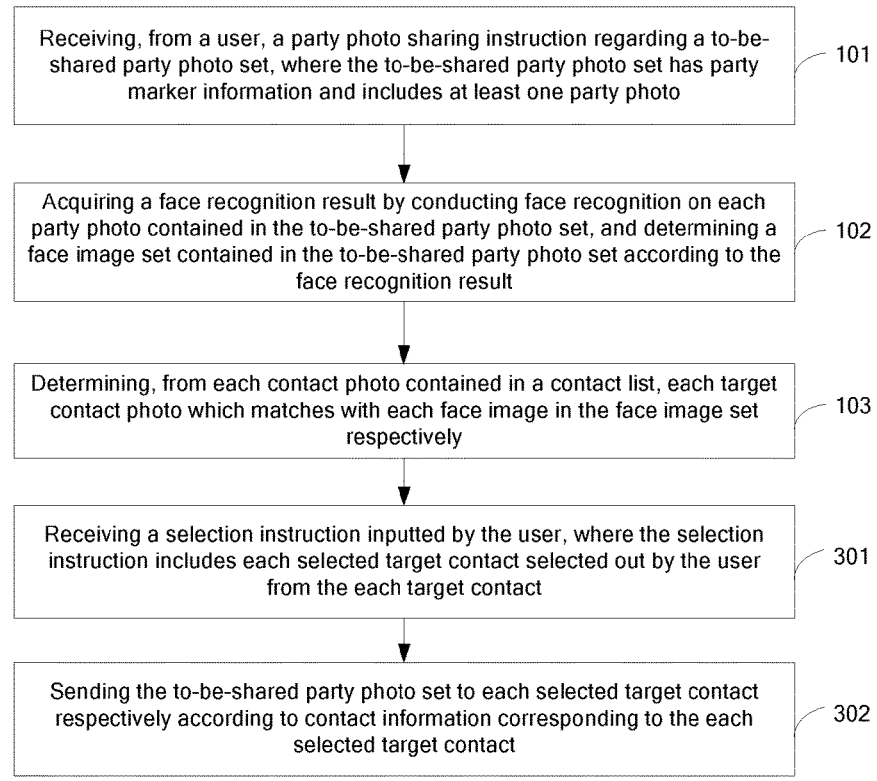
FIG. 3 illustrates a flowchart of Embodiment III of a photo sharing method according to an exemplary embodiment.

FIG. 3 illustrates a flowchart of Embodiment III of a photo sharing method according to an exemplary embodiment. As shown in FIG. 3, on the basis of the embodiment as shown in FIG. 1 or FIG. 2, before the foregoing Step 104, the following steps are also included.

In Step 301, a selection instruction inputted by the user is received, wherein the selection instruction includes each selected target contact selected by the user from each target contact.

Accordingly, after Step 301, the foregoing Step 104 is adaptively changed as follows.

In Step 302, the to-be-shared party photo set is sent to each selected target contact respectively according to contact information corresponding to the each selected target contact.

Figure 4:
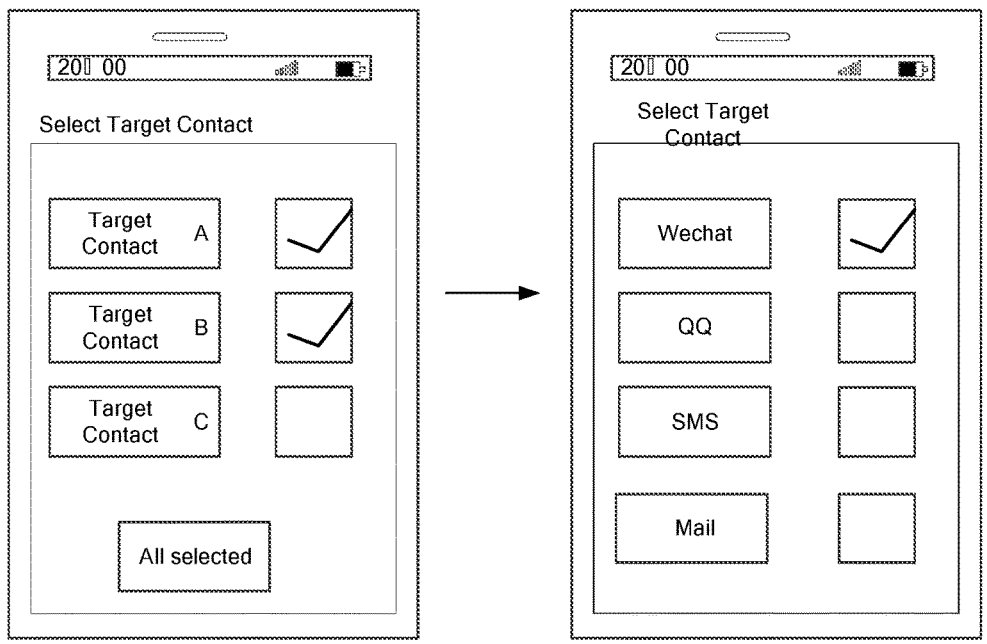
FIG. 4 illustrates a block diagram of an interface for selecting a target contact in a terminal according to the embodiment as shown in FIG. 3.

After each target contact is determined by matching each face image in the foregoing face image set with each contact photo in the contact list, each target contact may be displayed in a target contact selection interface as shown in FIG. 4 for the user to select. In FIG. 4, it is assumed that the target contacts include a target contact A, a target contact B and a target contact C. The user ticks selected target contacts such as the target contact A and B in FIG. 4 to send a selection instruction carrying each selected target contact to the terminal. Then, the terminal sends the to-be-shared party photo set to each selected target contact respectively according to contact information corresponding to the each selected target contact.

As previously mentioned, each target contact may have multiple pieces of contact information, and each of them corresponds to different communication modes, such as WeChat™, QQ™, SMS and E-mail, etc. Therefore, multiple communication modes may be displayed on the foregoing target contact selection interface for the user to select. For example, if the user selects the WeChat™ communication mode, the terminal will successively establish a WeChat™ dialogue according to the WeChat™ number of the each selected target contact based on contact information of each selected target contact, and send the to-be-shared party photo set to each selected target contact by means of WeChat™. In an embodiment, some target contacts may not be logged into the WeChat™, the processing for this case will be described in a subsequent embodiment. In the present embodiment, multiple alternative communication modes may also be displayed on the target contact selection interface for the user to select.

In the foregoing embodiments, after each target contact is determined, the to-be-shared party photo set is sent to each target contact. The following will introduce, with reference to the embodiment as shown in FIG. 5, a solution that party photos corresponding to each target contact (i.e., party photos containing the face image of a certain target contact) are sent to the target contact, thereby implementing a better targeted sharing of the party photo.

Figure 5:
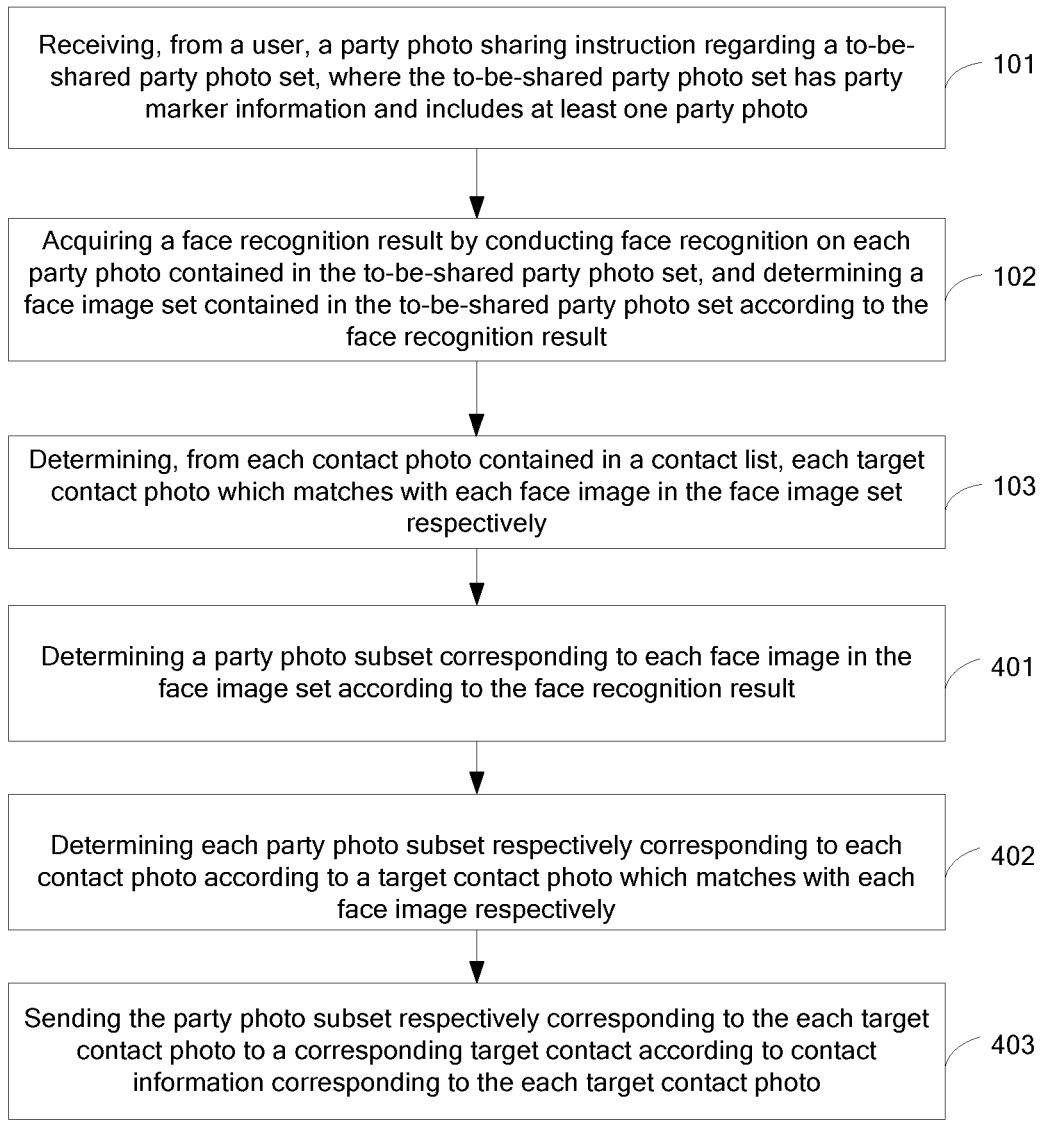
FIG. 5 illustrates a flowchart of Embodiment IV of a photo sharing method according to an exemplary embodiment.

FIG. 5 illustrates a flowchart of embodiment IV of a photo sharing method according to an exemplary embodiment. As shown in FIG. 5, based on the foregoing embodiments, the following steps are also included before the Step 104.

In Step 401, a party photo subset corresponding to each face image in the face image set is determined according to the face recognition result.

As previously mentioned, when the occurrence number of the face image representing the same person is determined, party photos containing the same clustering marker can be selected based on the clustering marker. Each clustering marker corresponds to one face image. Thus, each party photo subset corresponding to each face image in the face image set can be acquired.

In Step 402, each party photo subset corresponding to each contact photo is determined according to a target contact photo which matches with each face image respectively.

A corresponding relation between each party photo subset and each target contact photo can be determined based on the corresponding relation between each face image and the each target contact photo.

Thus, the Step 104 is adaptively changed as follows.

In Step 403, the party photo subset corresponding to the each target contact photo is sent to a corresponding target contact according to contact information associated with each target contact photo.

Figure 6:
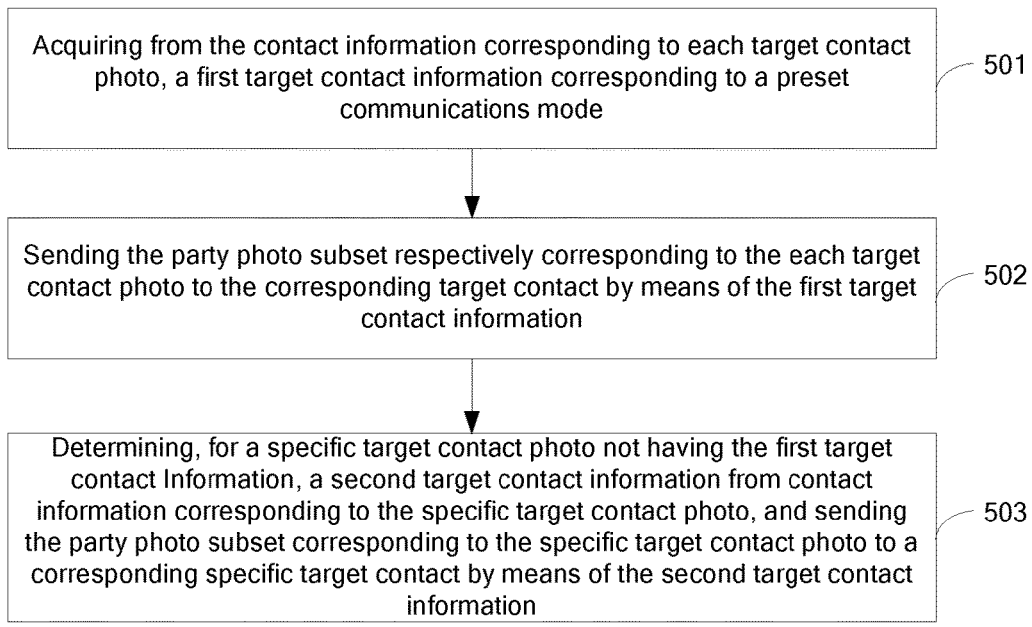
FIG. 6 illustrates a flowchart of an implementation of Step 403 in the embodiment as shown in FIG. 5.
Figure 7:
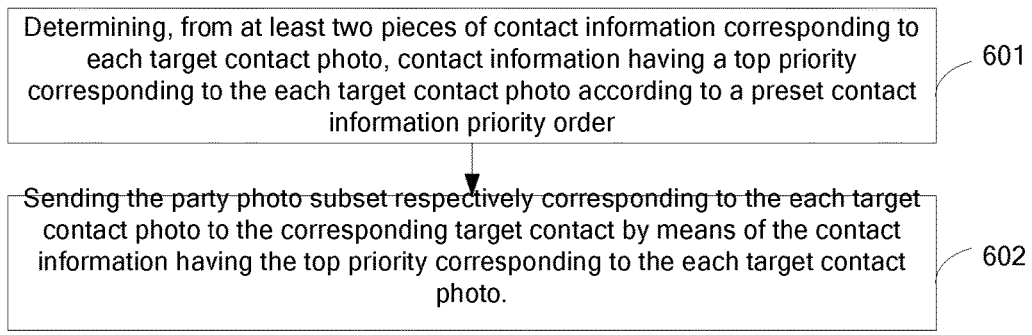
FIG. 7 illustrates a flowchart of another implementation of Step 403 in the embodiment as shown in FIG. 5.

In this embodiment, with reference to FIG. 6 and FIG. 7, two manners are provided for sending each party photo subset to the corresponding target contact.

FIG. 6 illustrates a flowchart of a specific implementation of Step 403 in the embodiment as shown in FIG. 5. As shown in FIG. 6, the foregoing Step 403 may be implemented in the following way.

In Step 501, first target contact information corresponding to a preset communication mode is acquired from the contact information associated with each target contact photo.

In Step 502, the party photo subset corresponding to each target contact photo is sent to the corresponding target contact by means of the first target contact information.

In Step 503, for a specific target contact photo not having the first target contact information, second target contact information is determined from contact information associated with the specific target contact photo, and the party photo subset corresponding to the specific target contact photo is sent to a corresponding specific target contact by means of the second target contact information.

In this implementation, it is assumed that there may be a diversity of contact information for each contact stored in the contact list, for example, a WeChat™ number, a QQ™ number or a mobile phone number, etc. In this way, the terminal may be configured with a default preset communication mode. For example, the party photo subset may be sent and processed by means of WeChat™ by default. Thus, the terminal acquires a corresponding WeChat™ number from contact information of each target contact, establishes a WeChat™ dialogue with the each target contact, and sends out the party photo subset corresponding to the each target contact by means of WeChat™.

However, in an actual situation, one or more certain target contacts may be offline or may not be WeChat™ friends of the terminal user. Thus, WeChat™ numbers of these target contacts acquired by the terminal are unavailable because they are offline, or the WeChat™ number of a target contact cannot be acquired because the target contact is not a WeChat™ friend. In this case, in order to ensure successful transmission of the party photo subset, the terminal may select, from contact information of these target contacts, another piece of contact information, for example, a mobile phone number, so as to send the party photo subset by means of SMS. In this case, selection of the another piece of contact information (i.e., the foregoing second target contact information) may be selected randomly or may be selected in order based on priority ranking of multiple pieces of possible contact information in advance.

FIG. 7 illustrates a flowchart of another implementation of Step 403 in the embodiment as shown in FIG. 5. As shown in FIG. 7, the foregoing Step 403 may be implemented in the following way.

In Step 601, from at least two pieces of contact information corresponding to each target contact photo, contact information having a top priority corresponding to the each target contact photo is determined according to a preset contact information priority order.

In Step 602, the party photo subset corresponding to the each target contact photo is sent to the corresponding target contact by means of the contact information having the top priority associated with the each target contact photo.

In the implementation, it is assumed that the terminal conducts a priority ranking on some existing possible contact information in advance, for example, from high to low priority are: a WeChat™ number, MiTalk™, a QQ™ number, a mobile phone number and an e-mail address. The type of contact information corresponding to each target contact may be different from each other. For example, the contact information of Zhangsan includes a WeChat™ number and a mobile phone number, and the contact information of Lisi includes a QQ™ number and a mobile phone number. Therefore, the party photo subset may be differentially sent out according to existing contact information of each target contact in the contact list.

Specifically, for a case where there is only one piece of contact information corresponding to a certain target contact, the party photo subset corresponding to the target contact can be sent to the target contact only by means of the only contact information.

For another case where there are at least two pieces of contact information corresponding to each target contact, the contact information having a top priority corresponding to each target contact may be determined according to the foregoing priority order, and the party photo subset corresponding to the target contact can be sent to the target contact by means of the contact information having a top priority corresponding to each target contact.

In this embodiment, after determining the party photo subset corresponding to each face image in the face image set, party photos containing the face image thereof can be differentially sent to each target contact, thereby providing better user experience.

Figure 8:
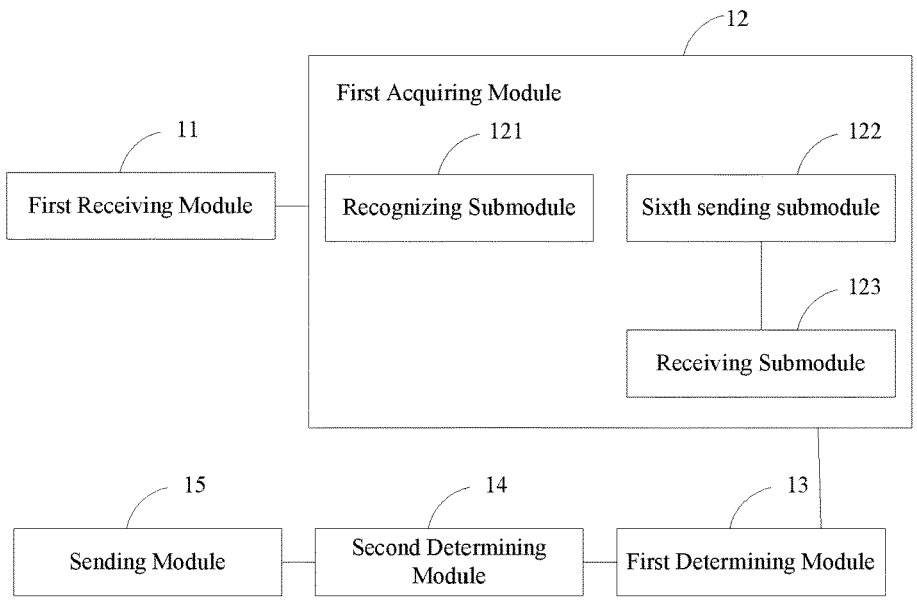
FIG. 8 illustrates a block diagram of Embodiment I of a photo sharing device according to an exemplary embodiment.

FIG. 8 illustrates a block diagram of Embodiment I of a photo sharing device according to an exemplary embodiment. As shown in FIG. 8, the device includes: a first receiving module 11, a first acquiring module 12, a first determining module 13, a second determining module 14 and a sending module 15.

The first receiving module 11 is configured to receive a party photo sharing instruction from a user regarding a to-be-shared party photo set, which has party marker information and includes at least one party photo.

The first acquiring module 12 is configured to acquire a face recognition result by conducting face recognition on each party photo contained in the to-be-shared party photo set.

The first determining module 13 is configured to determine a face image set contained in the to-be-shared party photo set according to the face recognition result.

The second determining module 14 is configured to determine each target contact photo which matches with each face image in the face image set respectively from each contact photo contained in a contact list.

The sending module 15 is configured to send the to-be-shared party photo set to each corresponding target contact according to contact information corresponding to each target contact photo.

In an embodiment, the first acquiring module 12 includes: a recognizing submodule 121, or, a sixth sending submodule 122 and a receiving submodule 123.

The recognizing submodule 121 is configured to conduct face recognition on each party photo contained in the to-be-shared party photo set by means of face recognition technology to acquire the face recognition result.

Alternatively, the first acquiring module includes: a sixth sending submodule 122, configured to send a processing request including the party marker information and a user account to a cloud server, so that the cloud server acquires the to-be-shared party photo set corresponding to the party marker information, from a cloud album corresponding to the user account, and conducts face recognition on each party photo contained in the to-be-shared party photo set by means of face recognition technology to acquire the face recognition result.

The receiving submodule 123 is configured to receive the face recognition result sent by the cloud server.

The photo sharing device in this embodiment may be configured to execute the technical solution of the method embodiment as shown in FIG. 1, the implementation principle and the technical effect is similar, thus not repeated anymore herein.

Figure 9:
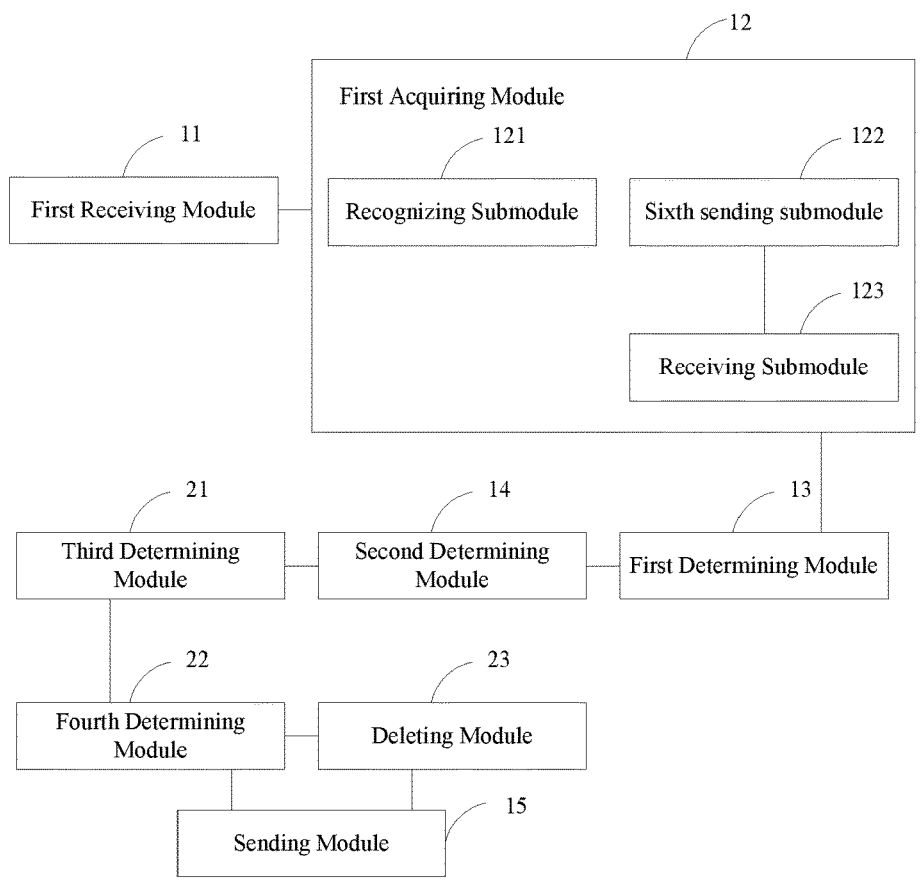
FIG. 9 illustrates a block diagram of Embodiment II of a photo sharing device according to an exemplary embodiment.

FIG. 9 illustrates a block diagram of Embodiment II of a photo sharing device according to an exemplary embodiment. As shown in FIG. 9, on the basis of the embodiment as shown in FIG. 8, the photo sharing device further includes: a third determining module 21, a fourth determining module 22 and a deleting module 23.

The third determining module 21 is configured to determine an occurrence number of each face image in the face image set according to the face recognition result.

The fourth determining module 22 is configured to determine whether a face image with an occurrence number smaller than a preset number is present in the face image set.

The deleting module 23 is configured to delete the face image with an occurrence number smaller than the preset number from the face image set, if the fourth determining module 22 determines the face image with an occurrence number smaller than the preset number is present in the face image set.

The photo sharing device in this embodiment may be configured to execute the technical solution of the method embodiment as shown in FIG. 2, the implementation principle and the technical effect are similar, thus not repeated anymore herein.

Figure 10:
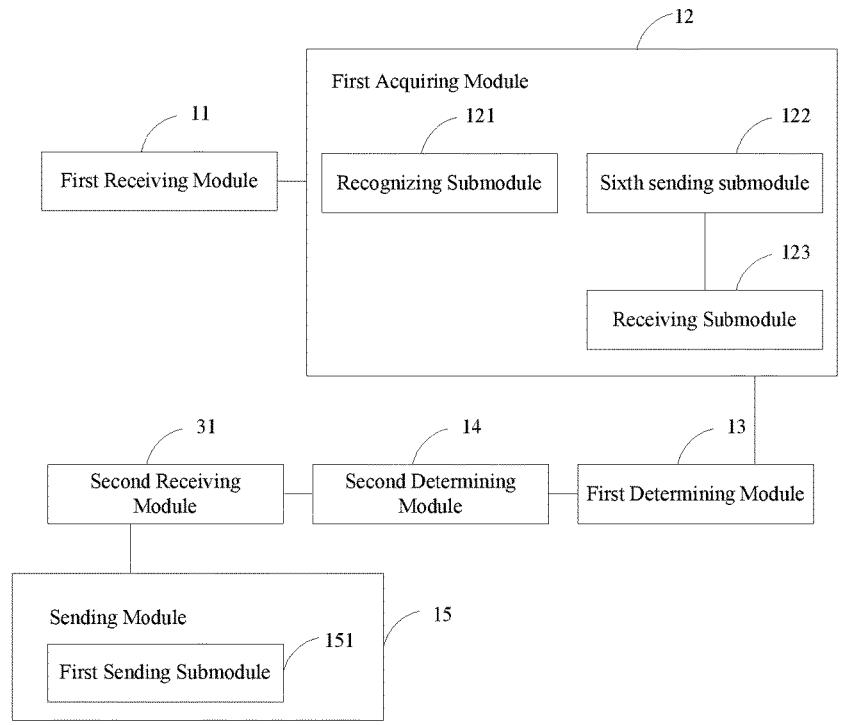
FIG. 10 illustrates a block diagram of Embodiment III of a photo sharing device according to an exemplary embodiment.

FIG. 10 illustrates a block diagram of Embodiment III of a photo sharing device according to an exemplary embodiment. As shown in FIG. 10, on the basis of the embodiment as shown in FIG. 8 or 9, the photo sharing device further includes a second receiving module 31 configured to receive a selection instruction inputted by the user, where the selection instruction includes each selected target contact selected by the user.

The sending module 15 includes: a first sending submodule 151.

The first sending submodule 151 is configured to send the to-be-shared party photo set to each corresponding target contact respectively, according to contact information corresponding to the each selected target contact.

The photo sharing device in this embodiment may be configured to execute the technical solution of the method embodiment as shown in FIG. 3, the implementation principle and the technical effect are similar, thus not repeated anymore herein.

Figure 11:
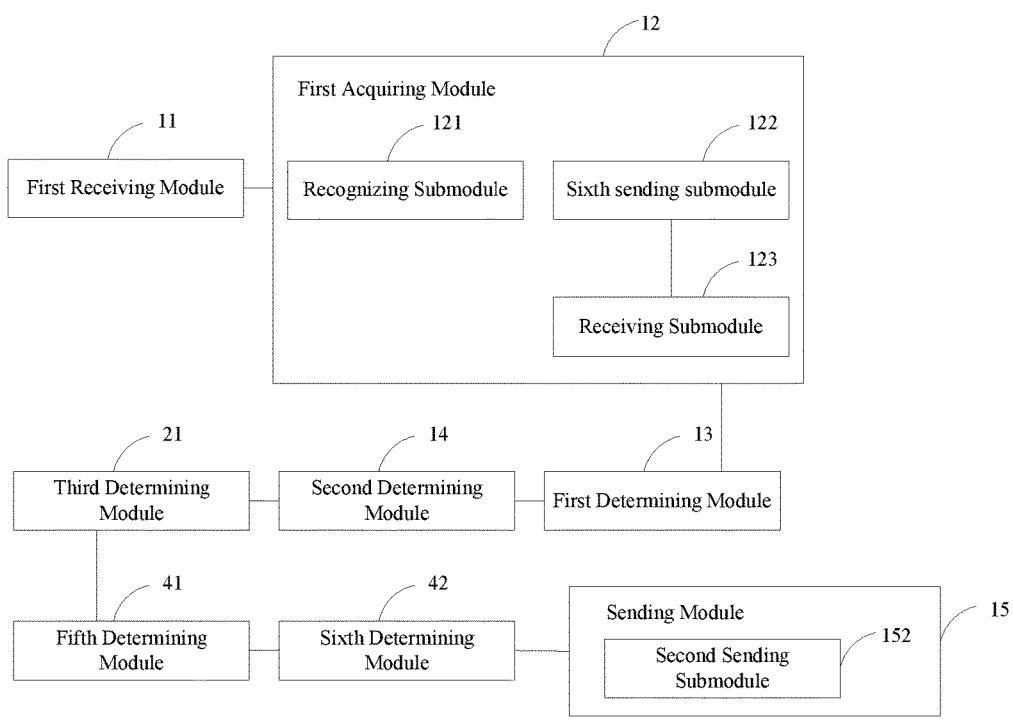
FIG. 11 illustrates a block diagram of Embodiment IV of a photo sharing device according to an exemplary embodiment.

FIG. 11 illustrates a block diagram of Embodiment IV of a photo sharing device according to an exemplary embodiment. As shown in FIG. 11, on the basis of the foregoing embodiment, the photo sharing device further includes: a fifth determining module 41 and a sixth determining module 42.

The fifth determining module 41 is configured to determine a party photo subset corresponding to each face image in the face image set according to the face recognition result.

The sixth determining module 42 is configured to determine a party photo subset corresponding to each contact photo respectively, according to a target contact photo which matches with each face image respectively.

The sending module 15 further includes a second sending submodule 152 configured to send the party photo subset corresponding to the each target contact photo respectively to the corresponding target contact according to contact information corresponding to each target contact photo.

Figure 12:
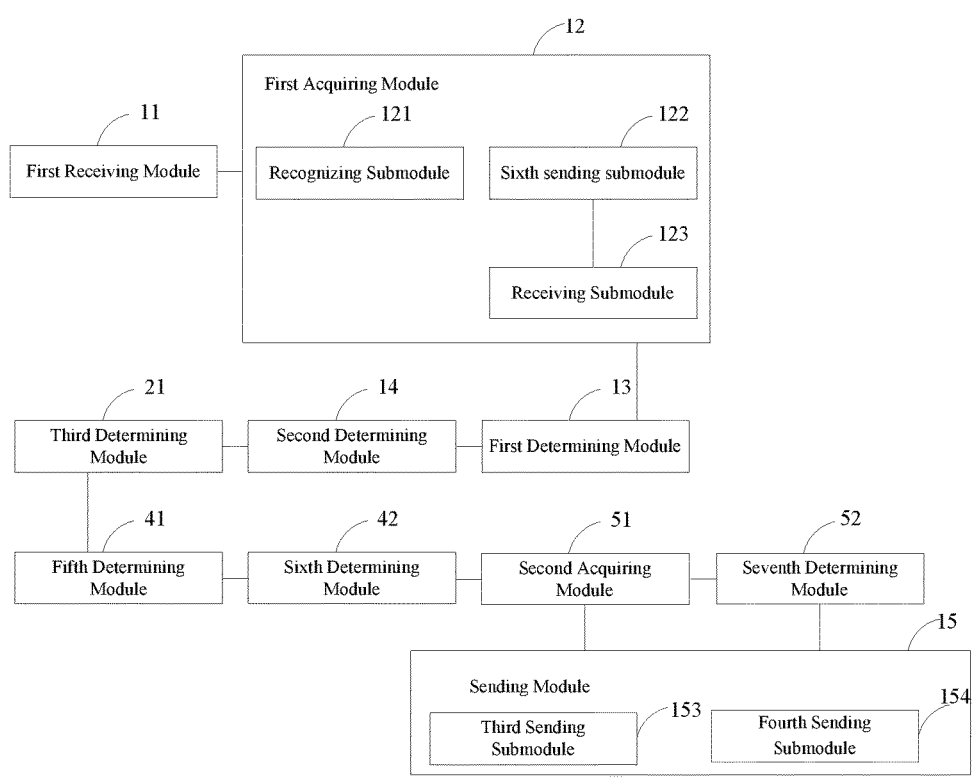
FIG. 12 illustrates a block diagram of Embodiment V of a photo sharing device according to an exemplary embodiment.

FIG. 12 illustrates a block diagram of Embodiment V of a photo sharing device according to an exemplary embodiment. As shown in FIG. 12, on the basis of the embodiment as shown in FIG. 11, the photo sharing device further includes: a second acquiring module 51.

The second acquiring module 51 is configured to acquire first target contact information corresponding to a preset communication mode, from the contact information corresponding to each target contact photo.

The sending module 15 includes: a third sending submodule 153.

The third sending submodule 153 is configured to send the party photo subset corresponding to the each target contact photo to the corresponding target contact by means of the first target contact information.

The photo sharing device further includes: a seventh determining module 52.

The seventh determining module 52 is configured to determine second target contact information for a specific target contact photo not having the first target contact information, from contact information corresponding to the specific target contact photo.

The sending module 15 includes: a fourth sending submodule 154.

The fourth sending submodule 154 is configured to send the party photo subset corresponding to the specific target contact photo to the corresponding specific target contact by means of the second target contact information.

Figure 13:
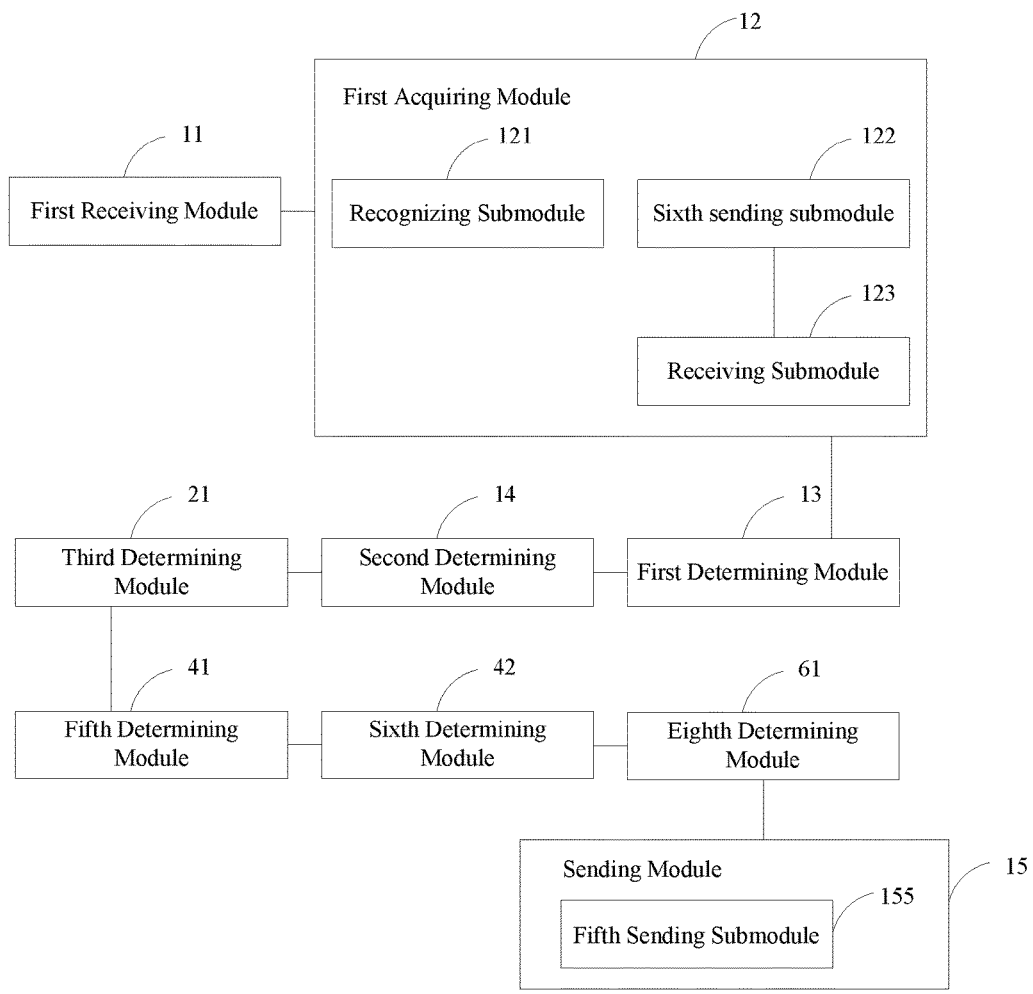
FIG. 13 illustrates a block diagram of Embodiment VI of a photo sharing device according to an exemplary embodiment.

FIG. 13 illustrates a block diagram of Embodiment VI of a photo sharing device according to an exemplary embodiment. As shown in FIG. 13, on the basis of the embodiment as shown in FIG. 11, the photo sharing device further includes: an eighth determining module 61.

The eighth determining module 61 is configured to determine contact information having a top priority corresponding to each target contact photo from at least two pieces of contact information corresponding to each target contact photo, according to a preset priority order of contact information.

The sending module includes: a fifth sending submodule 155.

The fifth sending submodule 155 is configured to send the party photo subset corresponding to the each target contact photo to the corresponding target contact by means of the contact information having a top priority corresponding to each target contact photo.

The photo sharing device as shown in FIGS. 11-13 may be configured to execute the technical solution of the method embodiments as shown in FIGS. 5-7, the implementation principle and the technical effect are similar, thus not repeated anymore herein.

With respect to the photo sharing device in the above embodiments, detailed description of specific manners for modules and submodules to execute an operation has been made in the embodiments related to the method, thus no elaboration will be made herein.

Figure 14:
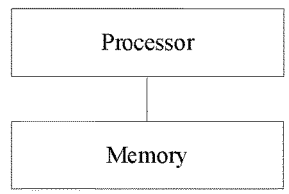
FIG. 14 illustrates a block diagram of a photo sharing apparatus according to an exemplary embodiment.

The above describes the internal function and structure of the photo sharing device. As shown in FIG. 14, in practice, the photo sharing device may be implemented as a processor and a memory configured to store instructions executable by the processor. Wherein the processor is configured to: receive, from a user, a party photo sharing instruction regarding a to-be-shared party photo set, where the to-be-shared party photo set has party marker information and includes at least one party photo; acquire a face recognition result by conducting face recognition on each party photo contained in the to-be-shared party photo set, and determine a face image set contained in the to-be-shared party photo set according to the face recognition result; determine, from each contact photo contained in a contact list, each target contact photo which matches with each face image in the face image set respectively; and send the to-be-shared party photo set to each corresponding target contact respectively according to contact information corresponding to each target contact photo.

Figure 15:
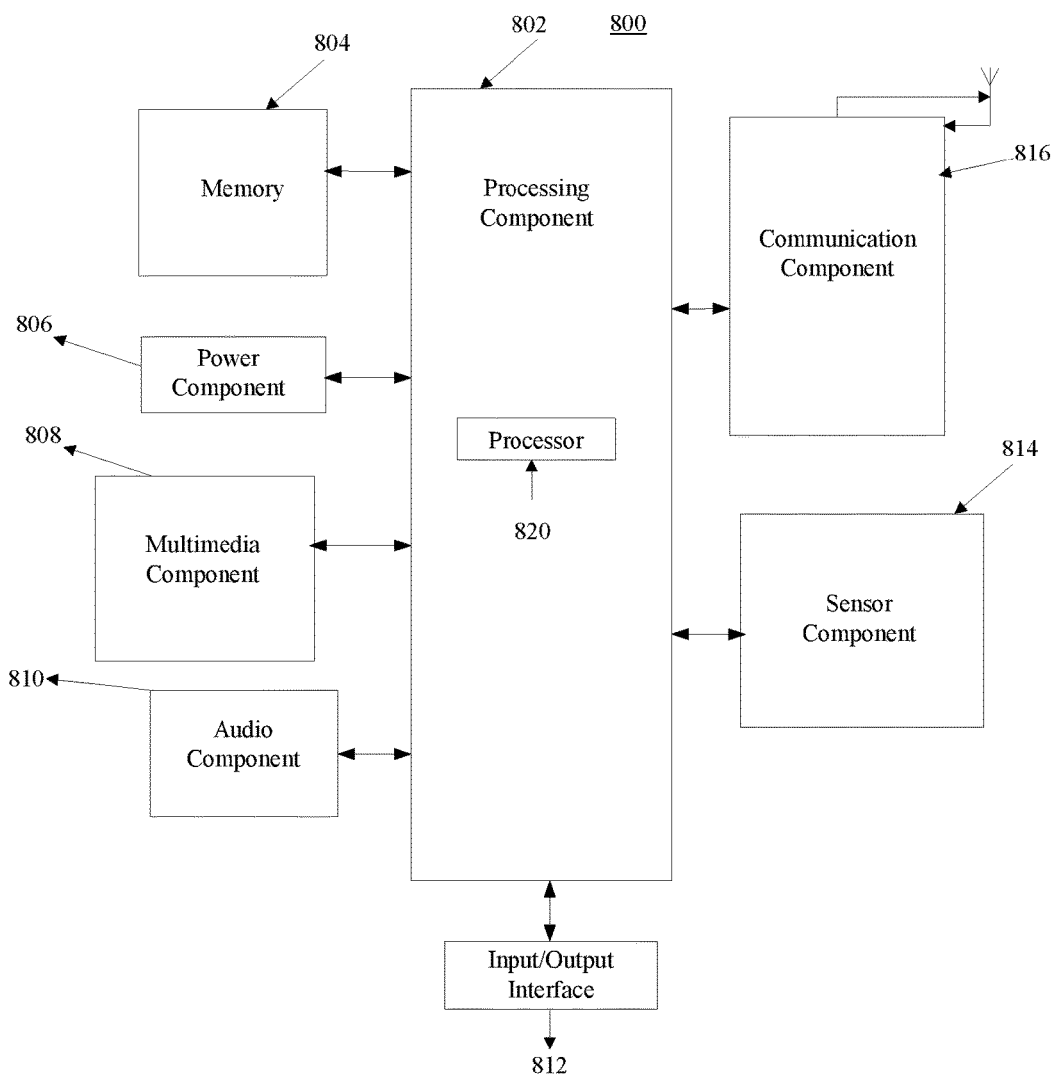
FIG. 15 illustrates a block diagram of another photo sharing apparatus according to an exemplary embodiment.

FIG. 15 illustrates a block diagram of another photo sharing device according to an exemplary embodiment. For example, the photo sharing device 800 may be a terminal device such as a smart mobile phone, a smart camera, a tablet computer, a portable computer or the like.

Referring to FIG. 15, the photo sharing device 800 may include one or more components as below: a processor component 802, a memory 804, an electrical component 806, a multimedia component 808, an audio component 810, an input/output (I/O) interface 812, a sensor component 814 and a communication component 816.

The processor module 802 generally controls the overall operation of the photo sharing device 800, for example, display, telephone call, data communications, and operations associated with camera operation and record operation. The processor component 802 may include one or more processors 820 for executing instructions to complete the steps of the foregoing method in part or in whole. In addition, the processor component 802 may include one or more modules for the convenience of interaction between the processor component 802 and other components. For example, the processor component 802 may include a multimedia module for the convenience of interaction between the multimedia component 808 and the processor component 802.

The memory 804 is configured to store different types of data so as to support the operation of the photo sharing device 800. Examples of the data include instructions of any application program or method operated on the photo sharing device 800, contact data, phonebook data, a message, a picture and a video, etc. The memory 804 may be implemented by any type of volatile or non-volatile memory device or combination thereof, for example, a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a magnetic disk or an optical disk.

The electrical component 806 provides power for components of the photo sharing device 800. The electrical component 806 may include a power management system, one or more power supplies, and other components associated with generation, management and power distribution of the photo sharing device 800.

The multimedia component 808 includes a screen between the photo sharing device 800 and a user for providing an output interface. In some embodiments, the screen may include a liquid crystal display (LCD) and a touch panel (TP). If the screen includes the touch panel, the screen may be implemented as a touch screen for receiving an input signal from the user. The touch panel includes one or more touch sensors for sensing touching, sliding and gestures on the touch panel. The touch sensor can not only sense a boundary of a touch or slide, but also detect the time duration and pressure related to the touch or slide operation. In some embodiments, the multimedia component 808 includes a front-facing camera and/or a rear-facing camera. When the photo sharing device 800 is in an operation mode, for example, a shooting mode or a video mode, the front-facing camera and/or the rear-facing camera may receive external multimedia data. Each front-facing camera and rear-facing camera may be a fixed optical lens system or have a focal length and optical zoom capability.

The audio component 810 is configured to output and/or input an audio signal. For example, the audio component 810 includes a microphone (MIC); when the photo sharing device 800 is in an operation mode such as a call mode, a record mode and a speech recognition mode, the microphone is configured to receive an external audio signal. The received audio signal may be further stored in the memory 804 or shared by the communication component 816. In some embodiments, the audio component 810 further includes a loudspeaker for outputting an audio signal.

The I/O interface 812 provides an interface for the processor component 802 and peripheral interface modules, the peripheral interface modules may be a keyboard, a click wheel and buttons, etc. These buttons may include but are not limited to: a home button, a volume button, a start button and a lock button.

The sensor component 814 includes one or more sensors for providing the photo sharing device 800 with state evaluation from all aspects. For example, the sensor component 814 may detect the on/off state of the photo sharing device 800, relative positioning of components, for example, the components are the displayer and keypads of the photo sharing device 800. The sensor component 814 also may detect the position change of the photo sharing device 800 or a component thereof, the presence or absence of users' touch on the photo sharing device 800, the direction or acceleration/deceleration of the photo sharing device 800, and temperature variation of the photo sharing device 800. The sensor component 814 may also include a proximity detector, which is configured to detect the presence of a nearby object in case of no physical contact. The sensor component 814 may also include an optical sensor, for example, a CMO or CCD image sensor, used in the application of imaging. In some embodiments, the sensor component 814 may also include an acceleration sensor, a gyro sensor, a magnetic sensor, a pressure sensor, or a temperature sensor.

The communication component 816 is configured to facilitate wired communication or wireless communication between the photo sharing device 800 and other equipment. The photo sharing device 800 is available for access to a wireless network based on communication standards, for example, WiFi, 2G or 3G or a combination thereof. In an exemplary embodiment, the communication component 816 receives, by means of a broadcast channel, a broadcast signal or broadcast-related information from an external broadcast management system. In an exemplary embodiment, the communication component 816 also includes a near field communication (NFC) module to promote short-range communication. For example, the NFC module may be realized on the basis of Radio Frequency Identification (RFID) Technology, Infrared Data Association (IrDA) Technology, Ultra-wide Bandwidth (UWB) Technology, Bluetooth (BT) Technology and other technologies.

In an exemplary embodiment, the photo sharing device 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic components to execute the foregoing method.

In an exemplary embodiment, a non-transitory computer readable storage medium including instructions is also provided, for example, a memory 804 including the instructions. The foregoing instruction may be executed by the processor 820 of the photo sharing device 800 to achieve the foregoing method. For example, the non-transitory computer readable storage medium may be ROM, random access memory (RAM), CD-ROM, magnetic tape, floppy disk and optical data storage device, etc.

As a non-transitory computer readable storage medium, instructions therein may be executed by a processor of the photo sharing device 800 so that the photo sharing device 800 can execute the foregoing photo sharing method. The method includes: receiving, from a user, a party photo sharing instruction regarding a to-be-shared party photo set, where the to-be-shared party photo set has party marker information and includes at least one party photo; acquiring a face recognition result by conducting face recognition on each party photo contained in the to-be-shared party photo set, and determining a face image set contained in the to-be-shared party photo set according to the face recognition result; determining, from each contact photo contained in a contact list, each target contact photo which matches with each face image in the face image set respectively; and sending the to-be-shared party photo set to each corresponding target contact respectively according to contact information corresponding to each target contact photo.

Other embodiments will be apparent to those skilled in the art from consideration of the specification and practice of the disclosure here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof It is intended that the scope of the invention only be limited by the appended claims.

What is claimed is:
1. A photo sharing method performed by a terminal device, comprising:
   receiving, from a user, a party photo sharing instruction regarding a to-be-shared party photo set, wherein the to-be-shared party photo set has party marker information and comprises at least one party photo;

acquiring a face recognition result by conducting face recognition on each party photo contained in the to-be-shared party photo set, and determining a face image set contained in the to-be-shared party photo set according to the face recognition result;

determining, from each contact photo contained in a contact list, each target contact photo which matches with each face image in the face image set respectively; and sending the to-be-shared party photo set to each target contact respectively according to contact information corresponding to the each target contact photo;

wherein acquiring a face recognition result by conducting face recognition on each party photo contained in the to-be-shared party photo set comprises:

detecting face images contained in all party photos of the to-be-shared party photo set; and clustering together face images having similarity greater than a threshold to acquire at least one clustering result, wherein face images of each clustering result correspond to a same person and each clustering result is represented by one selected face image; and wherein the face image set comprises the represented face images of all clustering results, and wherein the method further comprises:

determining an occurrence number of each face image in the face image set according to the face recognition result;

determining whether the occurrence number of a face image in the face image set is less than a preset number; and deleting, from the face image set, the face image if the occurrence number of the face image is less than the preset number;

wherein before sending the to-be-shared party photo set to each target contact respectively according to contact information corresponding to the each target contact photo, the method further comprises:

determining a party photo subset corresponding to each face image in the face image set according to the face recognition result; and determining a party photo subset respectively corresponding to the each target contact photo according to the each target contact photo which matches with the each face image respectively;

sending the to-be-shared party photo set to each target contact respectively according to contact information corresponding to the each target contact photo comprises:

sending the party photo subset respectively corresponding to the each target contact photo to the each target contact according to contact information corresponding to the each target contact photo;

wherein each contact corresponds to at least two pieces of the contact information, and each piece of contact information is associated with a different communication mode;

sending the party photo subset respectively corresponding to the each target contact photo to the each target contact according to contact information corresponding to the each target contact photo comprises:

determining, from the at least two pieces of contact information corresponding to the each target contact photo according to a preset communication mode priority order, the piece of contact information associated with the communication mode having a top priority corresponding to the each target contact photo; and sending the party photo subset respectively corresponding to the each target contact photo to the each target contact by means of the communication mode having the top priority according to the determined piece of contact information corresponding to the each target contact photo.

2. The method of claim 1, wherein before sending the to-be-shared party photo set to each target contact respectively according to contact information corresponding to the each target contact photo, the method further comprises:

receiving a selection instruction inputted by the user, wherein the selection instruction comprises each selected target contact selected by the user from the each target contact;

sending the to-be-shared party photo set to each target contact according to contact information corresponding to the each target contact photo comprises:

sending the to-be-shared party photo set to the each selected target contact respectively according to contact information corresponding to the each selected target contact.

3. The method of claim 1, wherein sending the party photo subset respectively corresponding to the each target contact photo to the each target contact according to contact information corresponding to the each target contact photo comprises:

acquiring, from the contact information corresponding to the each target contact photo, first target contact information associated with a first preset communication mode; and sending the party photo subset respectively corresponding to the each target contact photo to the each target contact by means of the first preset communication mode according to the first target contact information.

4. The method of claim 3, wherein after the acquiring, from the contact information corresponding to the each target contact photo, a first target contact information corresponding to a preset communication mode, the method further comprises:

for a specific target contact photo without the first target contact information, determining, from contact information corresponding to the specific target contact photo, second target contact information associated with a second preset communication mode, and sending a party photo subset corresponding to the specific target contact photo to a specific target contact by means of the second preset communication mode according to the second target contact information.

5. The method of claim 1, wherein acquiring a face recognition result by conducting face recognition on each party photo contained in the to-be-shared party photo set comprises:

conducting, by means of face recognition technology, the face recognition on each party photo contained in the to-be-shared party photo set to acquire the face recognition result.

6. The method of claim 1, wherein acquiring a face recognition result by conducting face recognition on each party photo contained in the to-be-shared party photo set comprises:

sending a processing request comprising the party marker information and a user account to a cloud server, wherein the cloud server is configured to:

acquire, from a cloud album corresponding to the user account, the to-be-shared party photo set corresponding to the party marker information, and conduct the face recognition on each party photo contained in the to-be-shared party photo set by means of face recognition technology to acquire the face recognition result; and receiving the face recognition result sent by the cloud server.

7. A photo sharing device, comprising:

a processor; and a memory configured to store instructions executable by the processor;

wherein, the processor is configured to perform:

receiving, from a user, a party photo sharing instruction regarding a to-be-shared party photo set, wherein the to-be-shared party photo set has party marker information and comprises at least one party photo;

acquiring a face recognition result by conducting face recognition on each party photo contained in the to-be-shared party photo set, and determining a face image set contained in the to-be-shared party photo set according to the face recognition result;

determining, from each contact photo contained in a contact list, each target contact photo which matches with each face image in the face image set respectively; and sending the to-be-shared party photo set to each target contact respectively according to contact information corresponding to the each target contact photo;

wherein acquiring a face recognition result by conducting face recognition on each party photo contained in the to-be-shared party photo set comprises:

detecting face images contained in all party photos of the to-be-shared party photo set; and clustering together face images having similarity greater than a threshold to acquire at least one clustering result, wherein face images of each clustering result correspond to a same person and each clustering result is represented by one selected face image; and wherein the face image set comprises the represented face images of all clustering results, and wherein the processor is further configured to perform:

determining an occurrence number of each face image in the face image set according to the face recognition result;

determining whether the occurrence number of a face image in the face image set is less than a preset number; and deleting, from the face image set, the face image if the occurrence number of the face image is less than the preset number;

wherein before sending the to-be-shared party photo set to each target contact respectively according to contact information corresponding to the each target contact photo, the processor is further configured to perform:

determining a party photo subset corresponding to each face image in the face image set according to the face recognition result; and determining a party photo subset respectively corresponding to the each target contact photo according to the each target contact photo which matches with the each face image respectively;

sending the to-be-shared party photo set to each target contact respectively according to contact information corresponding to the each target contact photo comprises:

sending the party photo subset respectively corresponding to the each target contact photo to the each target contact according to contact information corresponding to the each target contact photo;

wherein each contact corresponds to at least two pieces of the contact information, and each piece of contact information is associated with a different communication mode;

in the sending the party photo subset respectively corresponding to the each target contact photo to the each target contact according to contact information corresponding to the each target contact photo, the processor is configured to perform:

determining, from the at least two pieces of contact information corresponding to the each target contact photo according to a preset communication mode priority order, the piece of contact information associated with the communication mode having a top priority corresponding to the each target contact photo; and sending the party photo subset respectively corresponding to the each target contact photo to the each target contact by means of the communication mode having the top priority according to the determined piece of contact information corresponding to the each target contact photo.

8. The device of claim 7, wherein before sending the to-be-shared party photo set to each target contact respectively according to contact information corresponding to the each target contact photo, the processor is further configured to perform:

receiving a selection instruction inputted by the user, wherein the selection instruction comprises each selected target contact selected by the user among the each target contact;

sending the to-be-shared party photo set to each target contact respectively according to contact information corresponding to the each target contact photo comprises:

sending the to-be-shared party photo set to the each selected target contact respectively according to contact information corresponding to the each selected target contact.

9. The device of claim 7, wherein in the sending the party photo subset respectively corresponding to the each target contact photo to the each target contact according to contact information corresponding to the each target contact photo, the processor is configured to perform:

acquiring, from the contact information corresponding to the each target contact photo, a first piece of target contact information associated with a first preset communication mode; and sending the party photo subset respectively corresponding to the each target contact photo to the each target contact by means of the first preset communication mode according to the first target contact information.

10. The device of claim 9, wherein after the acquiring, from the contact information corresponding to the each target contact photo, first target contact information corresponding to a preset communication mode, the processor is further configured to perform:

for a specific target contact photo without the first target contact information, determining, from contact information corresponding to the specific target contact photo, second target contact information associated with a second preset communication mode, and sending a party photo subset corresponding to the specific target contact photo to a specific target contact by means of the second preset communication mode according to the second target contact information.

11. The device of claim 7, wherein in the acquiring a face recognition result by conducting face recognition on each party photo contained in the to-be-shared party photo set, the processor is configured to perform:
  conducting, by means of face recognition technology, the face recognition on each party photo contained in the to-be-shared party photo set to acquire the face recognition result.

12. The device of claim 7, wherein in the acquiring a face recognition result by conducting face recognition on each party photo contained in the to-be-shared party photo set, the processor is configured to perform:
  sending a processing request comprising the party marker information and a user account to a cloud server, wherein the cloud server is configured to:
    acquire, from a cloud album corresponding to the user account, the to-be-shared party photo set corresponding to the party marker information, and
    conduct the face recognition on each party photo contained in the to-be-shared party photo set by means of face recognition technology to acquire the face recognition result; and
  receiving the face recognition result sent by the cloud server.

13. A non-transitory computer-readable storage medium having stored therein instructions that, when executed by a processor of a terminal device, causes the terminal device to perform a method for sharing photos, the method comprising:
  receiving, from a user, a party photo sharing instruction regarding a to-be-shared party photo set, wherein the to-be-shared party photo set has party marker information and comprises at least one party photo;
  acquiring a face recognition result by conducting face recognition on each party photo contained in the to-be-shared party photo set, and determining a face image set contained in the to-be-shared party photo set according to the face recognition result;
  determining, from each contact photo contained in a contact list, each target contact photo which matches with each face image in the face image set respectively; and
  sending the to-be-shared party photo set to each target contact respectively according to contact information corresponding to the each target contact photo;
  wherein acquiring a face recognition result by conducting face recognition on each party photo contained in the to-be-shared party photo set comprises:
    detecting face images contained in all party photos of the to-be-shared party photo set; and
    clustering together face images having similarity greater than a threshold to acquire at least one clustering result, wherein face images of each clustering result correspond to a same person and each clustering result is represented by one selected face image; and
  wherein the face image set comprises the represented face images of all clustering results, and
  wherein the method further comprises:
  determining an occurrence number of each face image in the face image set according to the face recognition result;
  determining whether the occurrence number of a face image in the face image set is less than a preset number; and
  deleting, from the face image set, the face image if the occurrence number of the face image is less than the preset number;
  wherein before sending the to-be-shared party photo set to each target contact respectively according to contact information corresponding to the each target contact photo, the method further comprises:
  determining a party photo subset corresponding to each face image in the face image set according to the face recognition result; and
  determining a party photo subset respectively corresponding to the each target contact photo according to the each target contact photo which matches with the each face image respectively;
  sending the to-be-shared party photo set to each target contact respectively according to contact information corresponding to the each target contact photo comprises:
  sending the party photo subset respectively corresponding to the each target contact photo to the each target contact according to contact information corresponding to the each target contact photo;
  wherein each contact corresponds to at least two pieces of the contact information, and each piece of contact information is associated with a different communication mode;
  sending the party photo subset respectively corresponding to the each target contact photo to the each target contact according to contact information corresponding to the each target contact photo comprises:
    determining, from the at least two pieces of contact information corresponding to the each target contact photo according to a preset communication mode priority order, the piece of contact information associated with the communication mode having a top priority corresponding to the each target contact photo; and
    sending the party photo subset respectively corresponding to the each target contact photo to the each target contact by means of the communication mode having the top priority according to the determined piece of contact information corresponding to the each target contact photo.

* * * * *